(No Model.)

R. S. DOBBIE.
REGULATOR FOR ELECTRIC MOTORS.

No. 400,315. Patented Mar. 26, 1889.

Witnesses.
Geo. W. Breck
Edward Thorpe

Inventor,
Robert S. Dobbie
By his Attorneys
Wiedersheim & Kintner

UNITED STATES PATENT OFFICE.

ROBERT S. DOBBIE, OF NEW YORK, N. Y., ASSIGNOR TO THE AMERICAN ELECTRIC MOTOR COMPANY, OF NEW JERSEY.

REGULATOR FOR ELECTRIC MOTORS.

SPECIFICATION forming part of Letters Patent No. 400,315, dated March 26, 1889.

Application filed December 12, 1888. Serial No. 293,381. (No model.)

*To all whom it may concern:*

Be it known that I, ROBERT S. DOBBIE, a subject of the Queen of Great Britain, residing in New York, county of New York, and State of New York, have made a new and useful invention in Regulators for Electric Motors, of which the following is a specification.

My invention relates particularly to that type of regulators in which the speed of the motor automatically controls the current flow from the battery by mechanically regulating the amount of current which passes through the motor itself, so that should the load at any time be diminished this flow is diminished.

To this end my invention consists in the mechanism hereinafter described, and particularly pointed out in the claims which follow this specification.

I am aware that it is old in the art to automatically regulate the flow of current from a source of electrical supply to a motor by causing a mechanically-impelled governor to either break the circuit wholly as the motor speeds up or to vary a resistance in the direct or supply circuit. My invention differs, essentially, from those, as will be hereinafter clearly pointed out and claimed.

Figure 1:
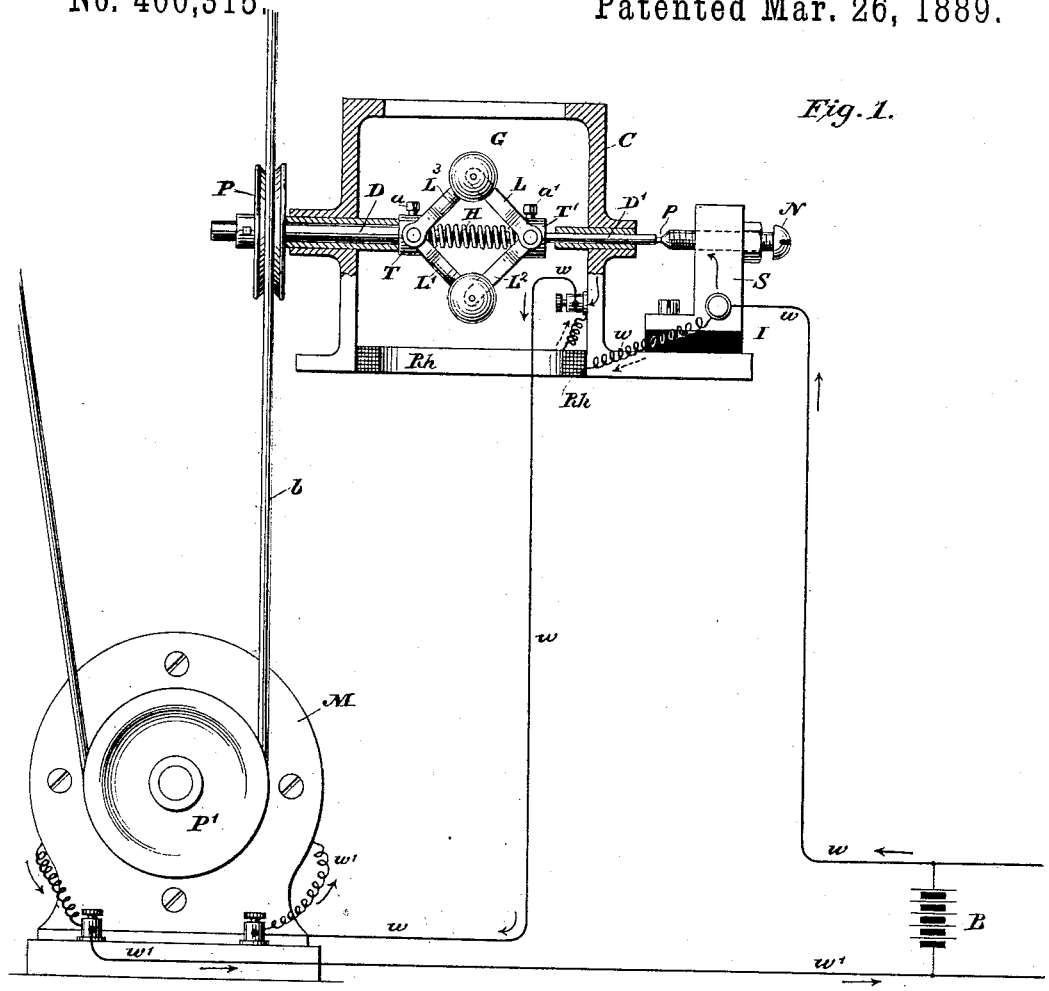
Figure 2:
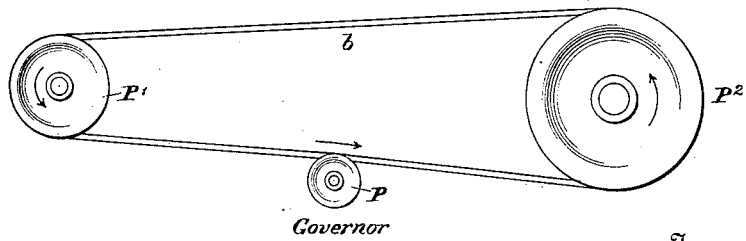

Referring to the accompanying drawings, Figure 1 is a general diagrammatic view showing the governor in sectional elevation and a motor to be governed or regulated with the battery or source of electrical supply. Fig. 2 is an elevational view in diminished size of the motor and governor pulleys, showing also the pulley of the mechanism to which the power is to be applied.

B is the battery or other source of electrical supply, connected by wires $w$ $w'$ through the regulator or governor G to the motor M.

C is a metallic box open at the top, as shown, and having a rheostat, R $h$, in its base, which may, if preferred, be adjustable. In this box is journaled the regulator G, which consists of a two-part shaft, D D', connected together by a well-known form of linked ball-governor, the links L L' L² L³ being connected to the balls and to collars T T', which latter are secured by adjustable screws $a$ $a'$ to the two-part shaft D and D'. The part D rotates in a long bearing or journal and carries a pulley, P, at its outer end. The part D' has longitudinal as well as rotary motion, and is adapted to contact at its outer end at $p$ with an adjustable contact-screw, N, carried on an insulated metallic standard, S, insulated from the base of box C at I.

H is a spiral spring, the ends of which fit over the ends of the shafts D and D', or over teats on collars T T', and held in place, thereby tending under normal conditions to force the sliding shaft D' into contact with the adjustable screw N at $p$. This spring may be of any required strength, or may be rendered more or less resilient by regulating the location of the collars T and T' on the shafts D and D'. It may be easily removed with a pair of pliers, or otherwise, through the opening in the top of the box C.

The operation of my improved regulator is as follows: The circuit being closed by any well-known form of switch, the current passes from battery B by wire $w$ in the direction of the arrows, to a binding-post on the insulated standard S, thence by screw N, points $p$, shaft D', and frame of box C to binding-post on inside of box C, and by wire $w$ to motor M, and finally back to battery B by wire $w'$. A small portion of the current passes at the same time and in the same direction through the rheostat R $h$, which is in a permanently-closed shunt between the two binding-posts of the regulator, as clearly shown. So long as the load the motor is required to move is constant, the power is transmitted from pulley P' by cord or belt $b$ to pulley P², (see Fig. 2,) and the regulator runs at normal speed, the same being insufficient to allow the centrifugal action of the governor-balls G to overcome the action of the spring H. When, however, the load is diminished and the motor tends to run at an abnormal speed, the governor-balls act in a well-known manner and cause shaft D' to be drawn to the left against the action of spring H, ultimately breaking the low-resistance circuit at $p$, thereby throwing all of the current through the rheostat R $h$, and hence diminishing the supply to the motor and causing it to quickly respond by slowing down, which operation is continued as often as the necessities of the case demand. By adjusting the location of the collars T and T' relatively a fixed speed may be attained for the motor dependent upon the work it is called upon to perform.

Having thus described my invention, what I claim, and desire to secure by Letters Patent of the United States, is—

1. In a regulator for an electric motor, a governor consisting of a two-part shaft connected together by hinged links and balls, one of said two-part shafts having longitudinal as well as rotary motion, substantially as described.

2. A regulator for an electric motor, consisting of the following combination of elements: a two-part shaft, one of which parts carries a pulley, the other being adapted to slide as well as rotate, a link or ball governor connecting said shafts, a spring normally holding the sliding shaft at its extreme position with a contact-point against which said sliding shaft may contact, and circuit-connections for connecting said regulator in circuit with the motor and source of electrical supply, substantially as described.

3. A governor adapted for use in an electric regulator, consisting of a two-part shaft connected together by links and an expansible spring, one of said shafts carrying a pulley and the other a contact-point, substantially as described.

4. A regulator for an electric motor, consisting of a metallic box or case sustaining a ball-governor connected to a two-part shaft, one of which parts carries a pulley and the other a contact-point, in combination with a rheostat and circuit-connections, substantially as described.

ROBERT S. DOBBIE.

Witnesses:
C. J. KINTNER,
L. L. SMITH.